(12) United States Patent
Blevins

(10) Patent No.: US 9,994,270 B2
(45) Date of Patent: Jun. 12, 2018

(54) LOWERABLE VEHICLE FRAME WITH A FOLDING TRAILER HITCH FOR TRAILERS AND OTHER VEHICLES

(71) Applicant: Timothy Donald Blevins, De Kalb, TX (US)

(72) Inventor: Timothy Donald Blevins, De Kalb, TX (US)

(73) Assignee: Timothy D. Blevins, Dekalb, TX (US)

( * ) Notice: Subject to any disclaimer, the term of this patent is extended or adjusted under 35 U.S.C. 154(b) by 12 days.

(21) Appl. No.: 15/215,351

(22) Filed: Jul. 20, 2016

(65) Prior Publication Data

US 2017/0057577 A1   Mar. 2, 2017

Related U.S. Application Data

(63) Continuation-in-part of application No. 14/835,238, filed on Aug. 25, 2015, now Pat. No. 9,527,355.

(60) Provisional application No. 62/245,108, filed on Oct. 22, 2015.

(51) Int. Cl.

| | |
|---|---|
| *B62D 63/06* | (2006.01) |
| *B60G 3/18* | (2006.01) |
| *B60G 13/00* | (2006.01) |
| *B60D 1/167* | (2006.01) |
| *B60D 1/46* | (2006.01) |
| *B60P 1/02* | (2006.01) |

(52) U.S. Cl.
CPC .......... *B62D 63/061* (2013.01); *B60D 1/167* (2013.01); *B60D 1/1675* (2013.01); *B60D 1/46* (2013.01); *B60G 3/18* (2013.01); *B60G 13/005* (2013.01); *B60P 1/027* (2013.01); *B62D 63/062* (2013.01)

(58) Field of Classification Search
CPC .... B62D 63/061; B60D 1/167; B60D 1/1675; B60D 1/46; B60G 3/18; B60G 13/005; B60P 1/027

See application file for complete search history.

(56) References Cited

U.S. PATENT DOCUMENTS

| | | | | |
|---|---|---|---|---|
| 3,429,585 | A * | 2/1969 | Ross | B62D 53/065 280/43.23 |
| 3,786,951 | A * | 1/1974 | Ruff | B60P 1/02 280/43.17 |
| 4,372,572 | A * | 2/1983 | Verschage | B60P 1/027 280/441.2 |
| 4,786,073 | A * | 11/1988 | Harper | B62D 63/061 280/491.1 |
| 8,151,426 | B2 * | 4/2012 | Schneider | B60D 1/07 280/417.1 |
| 8,182,193 | B2 * | 5/2012 | Gaudet | B60G 3/145 280/6.151 |
| 8,328,211 | B2 * | 12/2012 | VanDenberg | B60G 9/003 267/256 |
| 9,725,024 | B1 * | 8/2017 | Davis | B60P 1/16 |

(Continued)

*Primary Examiner* — Anne Marie M Boehler
*Assistant Examiner* — Marlon A Arce

(57) ABSTRACT

A lowerable vehicle frame with a folding trailer hitch for trailers and other vehicles has a vehicle frame, which can be transitioned between a lowered transit position and a raised deployed position through a swing suspension assembly and a plurality of lifting devices. A folding trailer hitch connected to the forward end of the vehicle frame allows the vehicle frame to be towed, and folds upwards for storage and aesthetics.

19 Claims, 9 Drawing Sheets

(56) References Cited

U.S. PATENT DOCUMENTS

| | | | | |
|---|---|---|---|---|
| 2006/0045693 A1* | 3/2006 | Elliot | ............ | B60P 1/027 |
| | | | | 414/481 |
| 2011/0181006 A1* | 7/2011 | Heppner | ............ | B60G 11/04 |
| | | | | 280/9 |
| 2011/0299963 A1* | 12/2011 | Aubrey | ............ | B60P 1/027 |
| | | | | 414/484 |
| 2012/0181760 A1* | 7/2012 | Catford | ............ | B60G 5/00 |
| | | | | 280/43.18 |
| 2016/0339824 A1* | 11/2016 | Dagenais | ............ | B62D 63/061 |

* cited by examiner

LOWERABLE VEHICLE FRAME WITH A FOLDING TRAILER HITCH FOR TRAILERS AND OTHER VEHICLES

The current application is a continuation-in-part (CIP) application of a U.S. non-provisional application Ser. No. 14/835,238 filed on Aug. 25, 2015. The current application also claims a priority to a U.S. provisional application Ser. No. 62/245,108 filed on Oct. 22, 2015.

FIELD OF THE INVENTION

The present invention relates generally to transport. More particularly, the present invention relates to towing and trailer hitches.

BACKGROUND OF THE INVENTION

A trailer is generally an unpowered vehicle pulled by a powered vehicle, which is used to transport, goods, equipment, or other materials. Many different types of trailers exist, such as travel trailers or popup campers, large semi-trailers transporting cargo, livestock trailers, food trailers, and restroom trailers.

A common practice for outdoor events such as concerts or community festivals is to provide temporary restrooms where the event does not take place at or near existing adequate facilities. Portable toilets, colloquially referred to as "porta potties", are often employed, but are cramped and typically do not have power or running water, leading to unpleasant and unsanitary conditions after repeated use. Luxury portable toilets exist which contain every amenity that a public bathroom would have such as running water, flushing toilets, stalls, mirrors, lighting and in some cases even air conditioning and hot water. Such luxury portable toilets are typically mounted on large "office-like" trailers or made from converted shipping containers, and are commonly found at higher end events where higher levels of convenience and comfort are desired, such as weddings, high end charity events, and movie shoots.

With typical restroom trailers, the frame is generally being positioned above the wheels required to transport the trailer, presenting a difficulty for providing access to wheelchairs and other handicapped persons, as steps, ramps and platforms must be put into place. The present invention seeks to address this difficulty by presenting a trailer suspension that allows the trailer to be lowered much closer to ground level, reducing the total height a ramp must traverse in order to provide access to the restroom compartment and reducing liability from potential falls.

Trailers are typically coupled to powered vehicles by a hitch, which is a linkage attached to the vehicle frame of a vehicle for towing. Hitches may take many forms including a tow ball, a tow pin, a tow hook with a trailer loop, or other forms. Hitches are typically permanently fixed to the vehicle frame of the trailer or other unpowered, towable vehicle, and thus are prone to occupying unnecessary space, inhibiting storage and being aesthetically unpleasing.

It is therefore a further object of the present invention to provide a lowerable vehicle frame with a trailer hitch for a towable vehicle which can be folded into a stored position for space reduction and aesthetic improvement.

DETAIL DESCRIPTIONS OF THE INVENTION

All illustrations of the drawings are for the purpose of describing selected versions of the present invention and are not intended to limit the scope of the present invention. The present invention is to be described in detail and is provided in a manner that establishes a thorough understanding of the present invention. There may be aspects of the present invention that may be practiced without the implementation of some features as they are described. It should be understood that some details have not been described in detail in order to not unnecessarily obscure focus of the invention.

Figure 1:
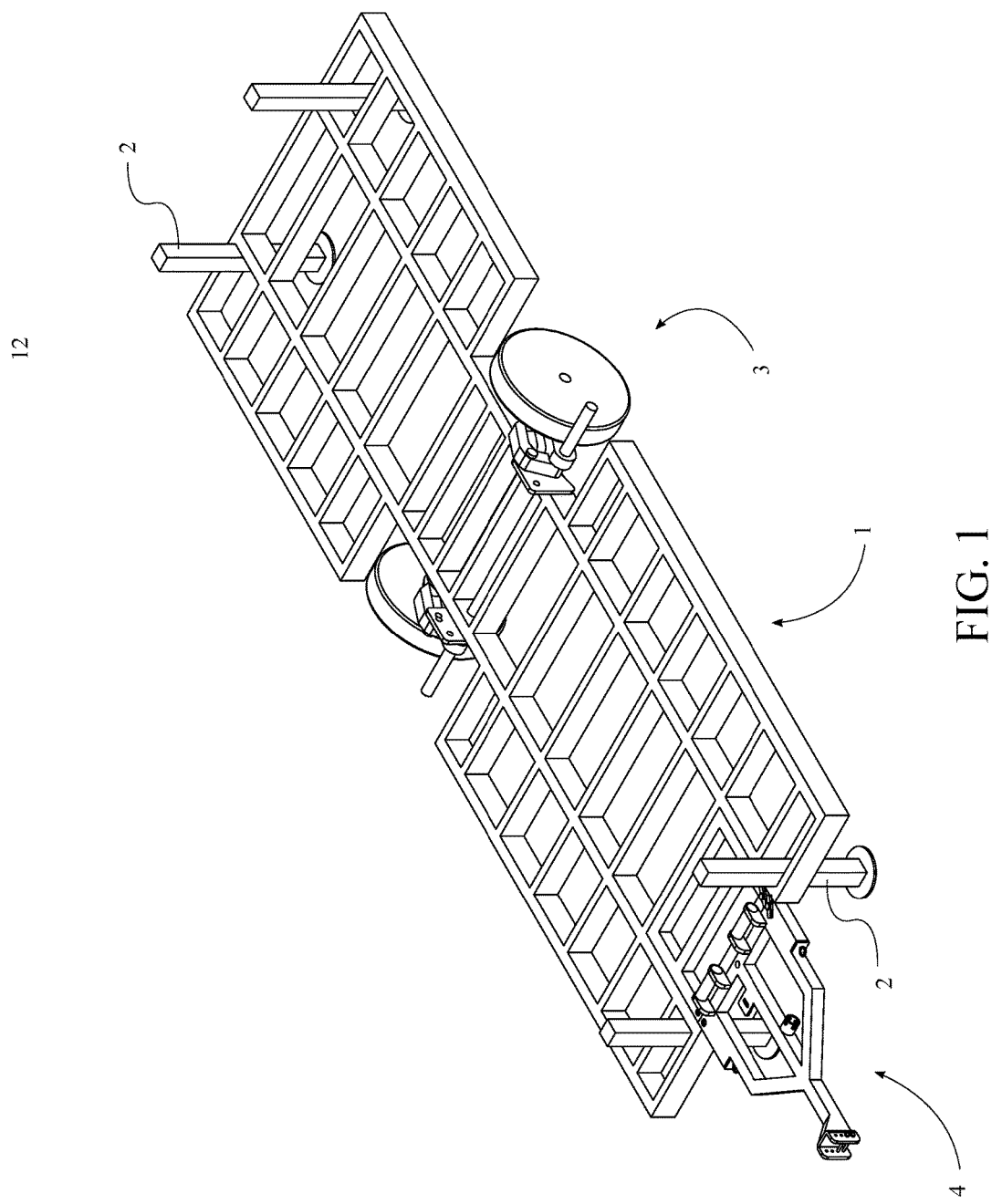
FIG. 1 is a perspective view of the present invention.

The present invention is a vehicle frame and suspension for towable trailers and other vehicles which enable the trailers to be lowered to near ground level to facilitate ease of access to the trailer, and which also comprises a folding trailer hitch for efficiency of space usage and aesthetics. As shown in FIG. 1, the present invention generally comprises a vehicle frame 1, a plurality of lifting devices 2, at least one swing suspension assembly 3, and a folding trailer hitch 4.

Figure 2:
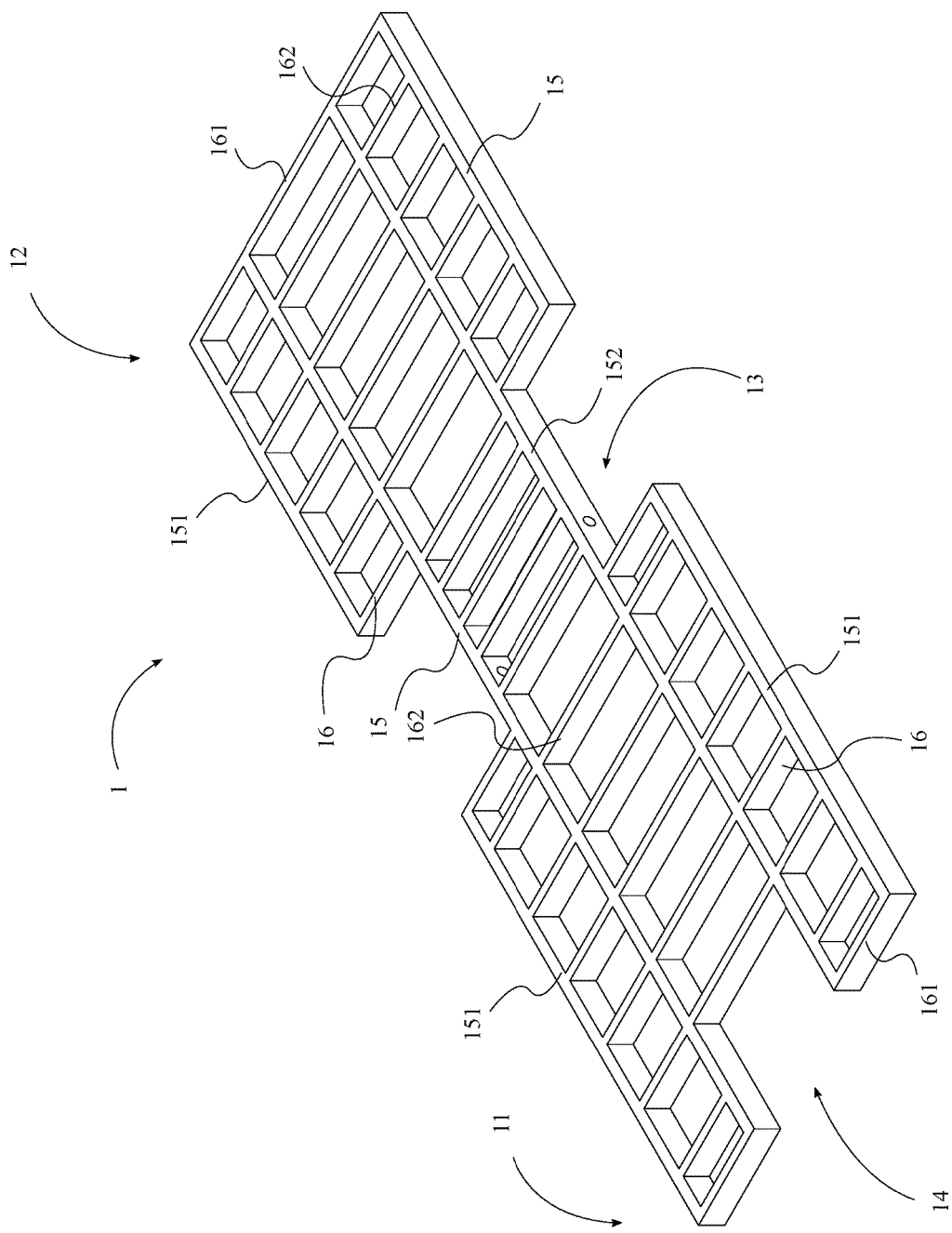
FIG. 2 is a perspective view of the vehicle frame.

Referring to FIG. 2, in one embodiment the vehicle frame 1 further comprises a forward end 11, a rear end 12, at least one suspension attachment location 13, and a hitch attachment location 14. The forward end 11 and the rear end 12 are longitudinal extremities of the vehicle frame 1.

The vehicle frame 1 serves as the foundational structure for supporting and transporting a cargo space as is typical with towable trailers. In one embodiment, the vehicle frame 1 is a generally rectangular arrangement of rigid structural components. In one embodiment, the vehicle frame 1 generally comprises a plurality of longitudinal members 15 and a plurality of lateral members 16 which are perpendicularly connected to each other in a grid-like fashion. More particularly, in one embodiment, the longitudinal members 15 comprise a plurality of outer longitudinal members 151 and a plurality of inner longitudinal members 152, the inner longitudinal members 152 being oriented longitudinally and positioned laterally between the outer longitudinal members 151, and the outer longitudinal members 151 being oriented laterally and forming the outer lateral boundary of the vehicle frame 1. Furthermore, the lateral members 16 are distributed longitudinally along the vehicle frame 1 and form structural connections between the longitudinal members 15. Similarly to the longitudinal members 15, the lateral members 16 comprises a plurality of outer lateral members 161 and a plurality of inner lateral members 162, the outer lateral members 161 forming the longitudinal boundaries of the vehicle frame 1 at the forward end 11 and the rear end 12, and the inner lateral members 162 being positioned longitudinally between the outer lateral members 161. However, it is contemplated that the vehicle frame 1 may comprise any configuration or arrangement which allows a trailer cargo space, restroom compartments or other components to be supported and transported.

Each suspension attachment location 13 is positioned between the forward end 11 and the rear end 12 and provides whatever structure or space is necessary for attachment of one of the swing suspension assemblies. In one embodiment, the structure of the vehicle frame 1 at each suspension attachment location 13 is laterally recessed inward toward a central longitudinal axis of the vehicle frame 1 in order to provide space to accommodate one of the swing suspension assemblies so that the wheel 38s of the swing suspension assembly 3 are substantially laterally even with the outer lateral boundary of the vehicle frame 1.

The hitch attachment location 14 is centrally positioned at the forward end 11 at the forward edge of the vehicle frame 1, so that the folding trailer hitch 4 may be installed and utilized to pull the present invention behind a powered vehicle. In one embodiment, the hitch attachment location 14 is configured as a longitudinally recessed portion of the vehicle frame 1 that provides a space to receive the folding trailer hitch 4. In one embodiment, the hitch attachment location 14 is not a recessed portion of the vehicle frame 1, and the vehicle frame 1 simply comprises the necessary fasteners, slots, protrusions, or other structural components and hardware necessary to facilitate attachment of the folding trailer hitch 4. In one embodiment, the folding trailer hitch 4 is permanently affixed onto the vehicle frame 1 at the forward end 11 through welding or other means, and the hitch attachment location 14 simply serves as an identifier for the location of the folding trailer hitch 4 in relation to the vehicle frame 1. The folding trailer hitch 4 is hingedly connected to the vehicle frame 1 at the hitch attachment location 14, enabling the folding trailer hitch 4 to hinge upwards for storage while not in use.

Each of the plurality of lifting devices 2 is any appropriate well-known or novel mechanism that is capable of exerting a substantial vertical force between the ground and the vehicle frame 1 in order to lift or lower the vehicle frame 1, such as, but not limited to, a hand operated jack, a hydraulic lack, an electric jack, a pneumatic jack, a hydraulic ram, and electric ram, or any other relevant and useful type of jack, ram, or any other lifting device in any combination if so desired. The plurality of lifting devices 2 is operatively engaged with the vehicle frame 1, wherein the vehicle frame 1 is vertically lifted or lowered by the plurality of lifting devices 2. The plurality of lifting devices 2 is distributed around the frame in any arrangement appropriate for jacking the vehicle, preferably at corners of the vehicle frame 1 or in another arrangement that balances the vertical force applied by the plurality of lifting devices 2. In one embodiment, the plurality of lifting devices 2 comprises four lifting devices 2, each of which are positioned at separate corners of the vehicle frame 1. In one embodiment, the plurality of lifting devices 2 comprises six lifting devices 2, four of which are positioned at separate corners of the vehicle frame 1, and two of which are positioned longitudinally between the forward end 11 and the rear end 12.

Each swing suspension assembly 3 is connected to the vehicle frame 1 at one of the suspension attachment locations 13. Each swing suspension assembly 3 comprises a first suspension half 30 and a second suspension half 31. The first suspension half 30 and the second suspension half 31 are positioned laterally opposite each other on the vehicle frame 1 for each swing suspension assembly 3. The first suspension half 30 and the second suspension half 31 are both releasably engaged between a lowered transit position 5 and a raised deployed position 6 relative to the vehicle frame 1, wherein a wheel 38 of the first suspension half 30 and the second suspension half 31 is raised in the raised deployed position 6 and lowered in the lowered transit position 5.

Figure 3:
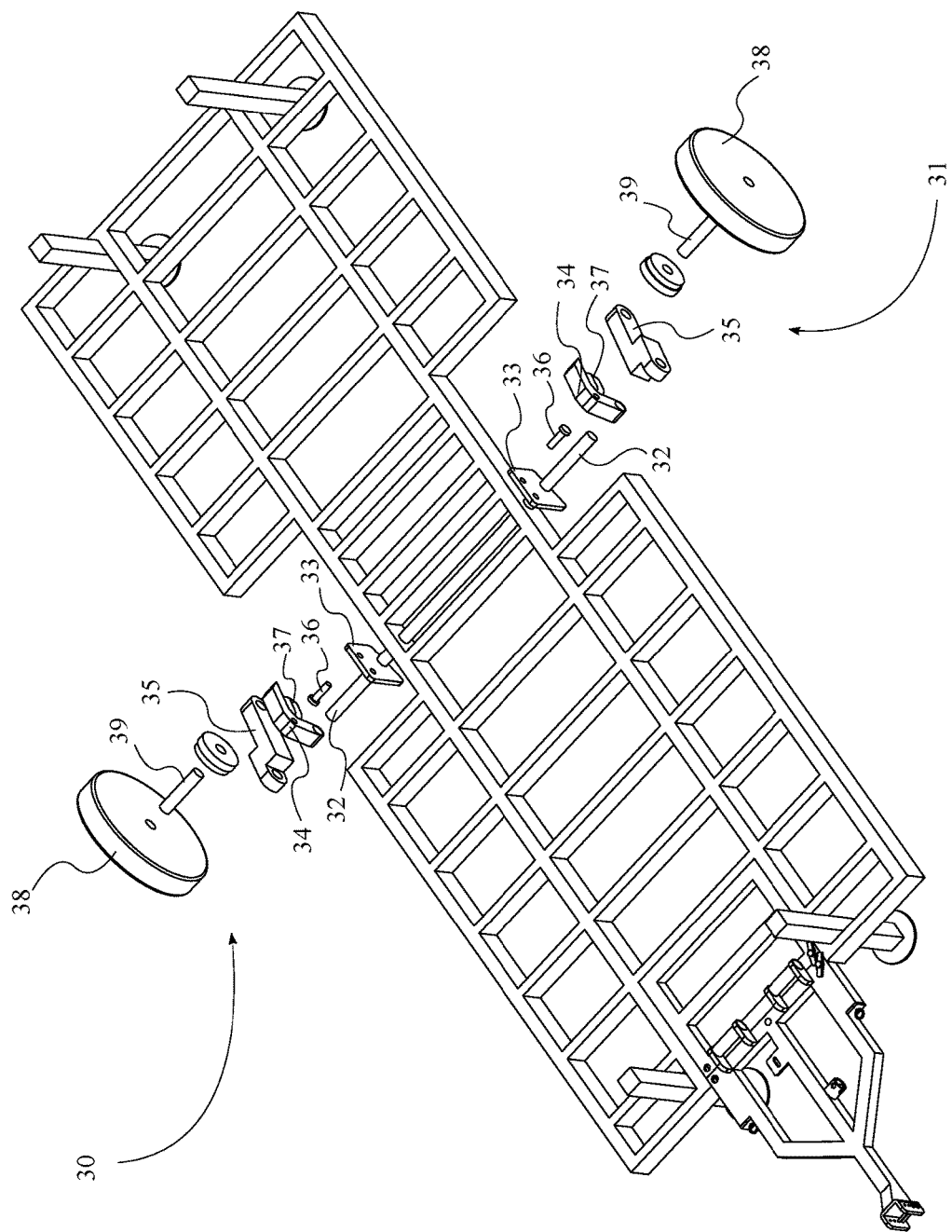
FIG. 3 is a perspective view of the present invention with the swing suspension assembly shown in an exploded view.

Referring to FIG. 3, for each swing suspension assembly 3, the first suspension half 30 and the second suspension half 31 each comprise a suspension axle 32, a suspension transition plate 33, an upper stop arm 34, a lower swing arm 35, a suspension transition pin 36, a damper pad 37, and a wheel 38.

The suspension axle 32 is connected to the vehicle frame 1 at the suspension attachment location 13. The suspension axle 32 is oriented horizontally and laterally with respect to the vehicle frame 1. The suspension axle 32 is fixed in place and does not rotate or translate with respect to the vehicle frame 1. In one embodiment, the first suspension half 30 and the second suspension half 31 each comprise their own suspension axle 32. In the preferred embodiment, however, the first suspension half 30 and the second suspension half 31 share the same suspension axle 32

Figure 4:
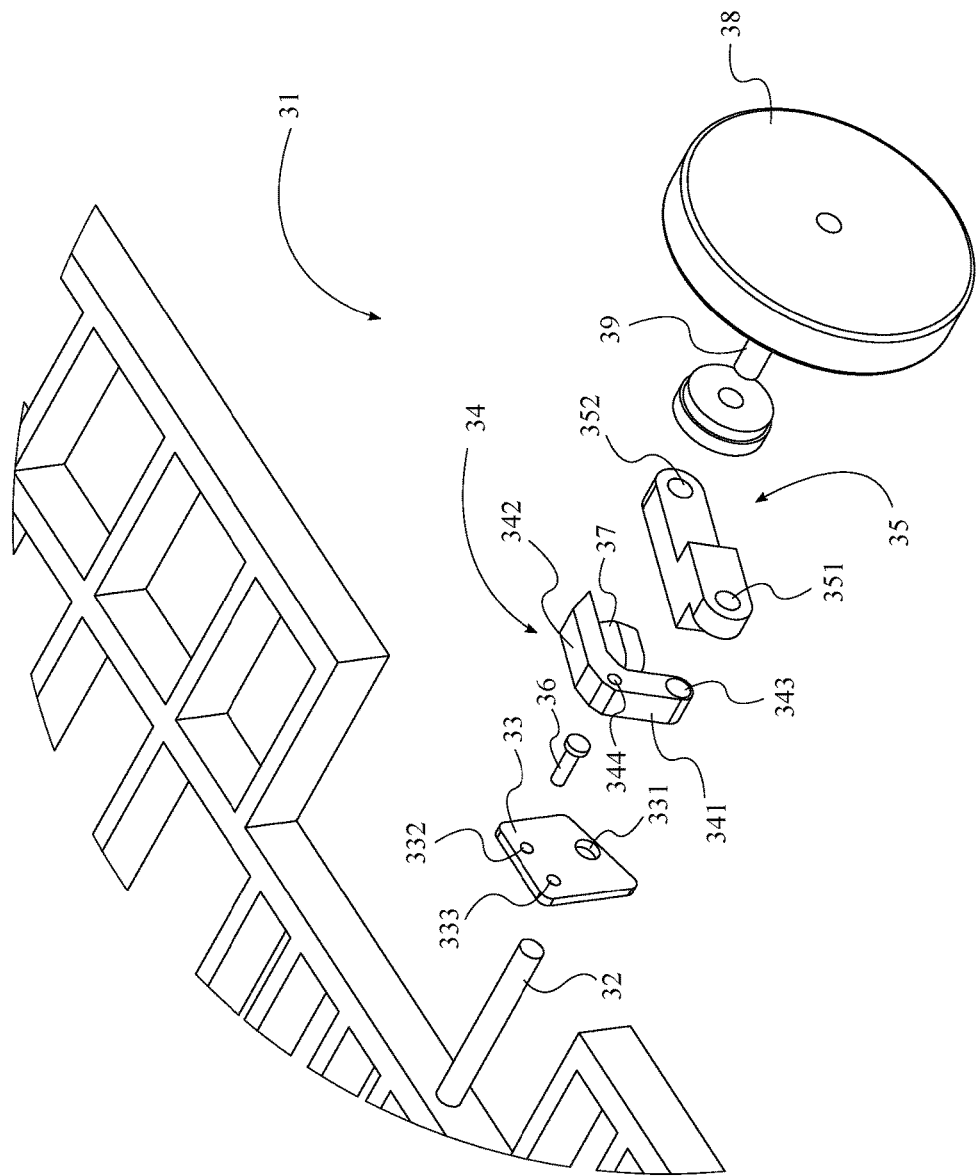
FIG. 4 is a detail exploded view of a half of the swing suspension assembly.

The suspension transition plate 33 is connected to the vehicle frame 1 adjacent to the axle attachment location. The suspension transition plate 33 facilitates the swing suspension assembly 3 to be affixed in either the raised deployed position 6 or the lowered transit position 5. Referring to FIG. 4, in one embodiment, the suspension transition plate 33 comprises a first suspension axle aperture 331, a transit position pin hole 332, and a deployed position pin hole 333. The first suspension axle aperture 331, the transit position pin hole 332 and the deployed position pin hole 333 are oriented parallel to each other and traverse completely through the suspension transition plate 33, laterally with respect to the vehicle frame 1. The transit position pin hole 332 and the deployed position pin hole 333 are positioned equidistant from the first suspension axle aperture 331. The first suspension axle aperture 331 of the suspension transition plate 33 is positioned adjacent to the suspension attachment location 13, and the suspension axle 32 traverses through the first suspension axle aperture 331 of the suspension transition plate 33 and the vehicle frame 1 at the suspension attachment location 13.

The upper stop arm 34 is also rotatably connected to the suspension axle 32, and is positioned adjacent to the suspension transition plate 33 opposite the vehicle frame 1. The upper stop arm 34 is substantially L-shaped, and comprises an axle connection portion 341, a damper pad 37 portion 342, a second suspension axle aperture 343, and a stop arm pin hole 344.

The second suspension axle aperture 343 is positioned on the axle connection portion 341 of the upper stop arm 34. The axle connection portion 341 is rotatably connected to the suspension axle 32 by the second suspension axle aperture 343, wherein the second suspension axle aperture 343, the third suspension axle aperture 351, and the first suspension axle aperture 331 are all oriented concentrically with each other, around the suspension axle 32.

The damper pad 37 portion 342 of the upper stop arm 34 is connected to the axle connection portion 341 opposite the second suspension axle aperture 343 along the axle connection portion 341 and is oriented perpendicular to the axle connection portion 341, forming an L shape. The damper pad 37 portion 342 is positioned adjacent to the damper pad 37 opposite the lower swing arm 35, wherein the damper pad 37 portion 342 is oriented generally parallel to the lower swing arm 35. In one embodiment, the stop arm pin hole 344 is positioned between the axle connection portion 341 and the damper pad 37 portion 342. More particularly, in one embodiment, the stop arm pin hole 344 is positioned at the 90-degree angular juncture of the axle connection portion 341 and the damper pad 37 portion 342. It is contemplated, however, that the position of the stop arm pin hole 344 should not be restricted to only the aforementioned position, and it is considered that other locations for the stop arm pin hole 344 on the upper stop arm 34 along with other geometrical modifications to various other components of the swing suspension assembly 3 may also be suitable for accomplishing the purpose and functionality of raising and lowering the swing suspension assembly 3 between the raised deployed position 6 and the lowered transit position 5.

The stop arm pin hole 344 and the second suspension axle aperture 343 are oriented parallel to each other. The distance between the first suspension axle aperture 331 of the suspension transition plate 33 and the transit position pin hole 332, the distance between the first suspension axle aperture 331 and the deployed position pin hole 333, and the distance between the second suspension axle aperture 343 of the upper stop arm 34 and the stop arm pin hole 344 are all equivalent to each other. This allows the upper stop arm 34 to be rotated about the suspension axle 32 so that the stop arm pin hole 344 can be concentrically aligned with either the transit position pin hole 332 or the deployed position pin hole 333, and may be affixed in place by the suspension transition pin 36.

The lower swing arm 35 is an elongated beam-like structural member that is rotatably connected to the suspension axle 32 at one end of the lower swing arm 35 and rotatably connected to the wheel 38 by a wheel axle 39 opposite the suspension axle 32. The lower swing arm 35 comprises a third suspension axle aperture 351 and a wheel axle aperture 352. The third suspension axle aperture 351 and the wheel axle aperture 352 are oriented parallel to each other, and are positioned opposite each other along the lower swing arm 35. The lower swing arm 35 is rotatably connected to the suspension axle 32 by the third suspension axle aperture 351, allowing the wheel axle aperture 352, and therefore the wheel 38, to be radially moved about the suspension axle 32 by rotating the lower swing arm 35. The lower swing arm 35 is rotatably connected to the suspension axle 32 adjacent to the upper stop arm 34 opposite the suspension transition plate 33.

The wheel axle 39 concentrically traverses through the wheel axle aperture 352 of the lower swing arm 35. The wheel 38 is concentrically positioned with the wheel axle 39 and is rotatably connected to the wheel axle 39; therefore, the wheel 38 is rotatably connected to the lower swing arm 35 by the wheel axle 39 opposite the suspension axle 32 along the lower swing arm 35. In alternate embodiments of the present invention, the wheel 38 is rotatably connected to the lower swing arm 35 by any other appropriate means. Additionally, in one embodiment of the present invention, a wheel 38 brake is operatively engaged with the wheel 38.

The lower swing arm 35 is positioned adjacent to the upper stop arm 34 opposite the suspension transition plate 33. The lower swing arm 35 preferably has slightly angled geometry that allows the first suspension axle aperture 331 of the lower swing arm 35 to be positioned adjacent to the second suspension axle aperture 343 of the upper stop arm 34 opposite the suspension transition plate 33, while having the lower swing arm 35 being positioned under the damper pad 37 portion 342 of the upper stop arm 34, so that the damper pad 37 may be appropriately positioned between the lower swing arm 35 and the upper stop arm 34. The upper stop arm 34 is releasably engaged with the suspension transition plate 33 by the suspension transition pin 36.

The third suspension axle aperture 351, the second suspension axle aperture 343, and the first suspension axle aperture 331 are concentrically positioned with each other. The third suspension axle aperture 351 is positioned adjacent to the second suspension axle aperture 343, and the first suspension axle aperture 331 is positioned adjacent to the second suspension axle aperture 343 opposite the third suspension axle aperture 351. In other words, the order from the suspension attachment location 13 outwards is: first suspension axle aperture 331, second suspension axle aperture 343, third suspension axle aperture 351. The suspension axle 32 concentrically traverses through the first suspension axle aperture 331, the second suspension axle aperture 343 and the third suspension axle aperture 351.

The damper pad 37 is attached between the lower swing arm 35 and the upper stop arm 34, and acts as a shock absorber between the lower swing arm 35 and the upper stop arm 34 while the present invention is transit. The damper pad 37 is positioned along the lower swing arm 35 between the third suspension axle aperture 351 and the wheel axle aperture 352. Preferably, the damper pad 37 is attached between the lower swing arm 35 and the upper stop arm 34 by a pair of opposing bolts, but may be affixed in place between the lower swing arm 35 and the upper stop arm 34 by any other appropriate hardware or other means. Since the damper pad 37 is affixed between the lower swing arm 35 and the upper stop arm 34, the lower swing arm 35 and the upper stop arm 34 are forced to rotate by the same angle, with a small amount of give due to deflection in the damper pad 37 by compressive or tensile forces applied to the damper pad 37 between the lower swing arm 35 and the upper stop arm 34. This allows the upper stop arm 34 and the lower swing arm 35 to be rotated in unison so that the suspension transition pin 36 may be inserted through the stop arm pin hole 344 of the upper swing arm in order to affix the wheel 38 in the lowered transit position 5 or in the raised deployed position 6, respectively.

Figure 5:
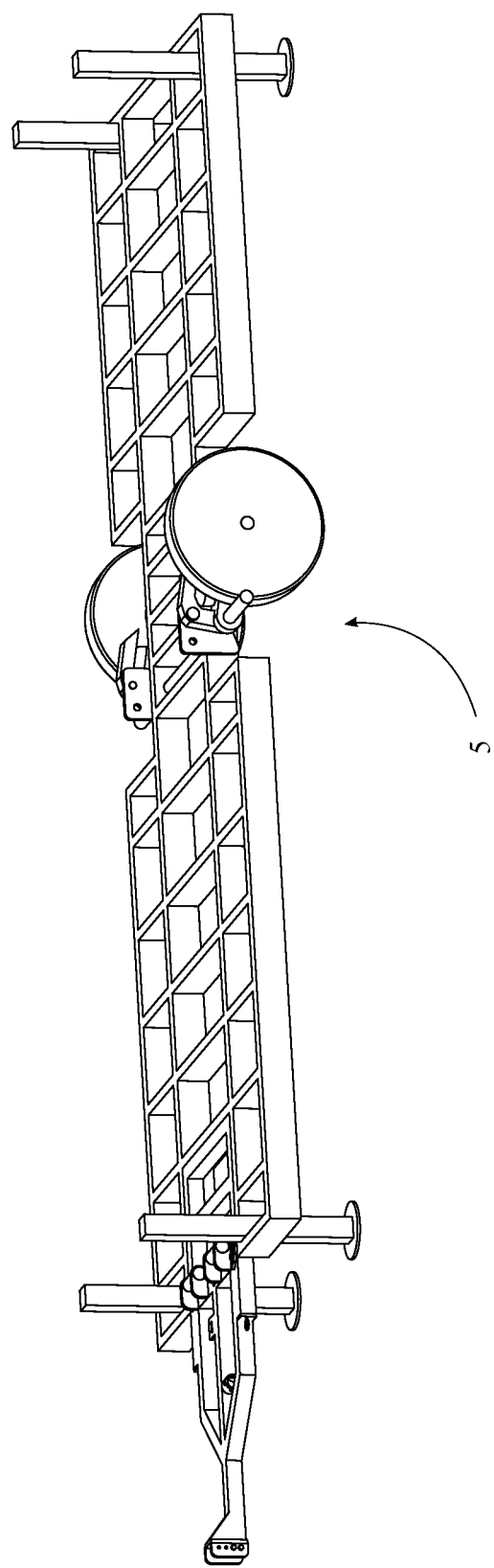
FIG. 5 is a side view of the present invention in the lowered transit position.
Figure 6:
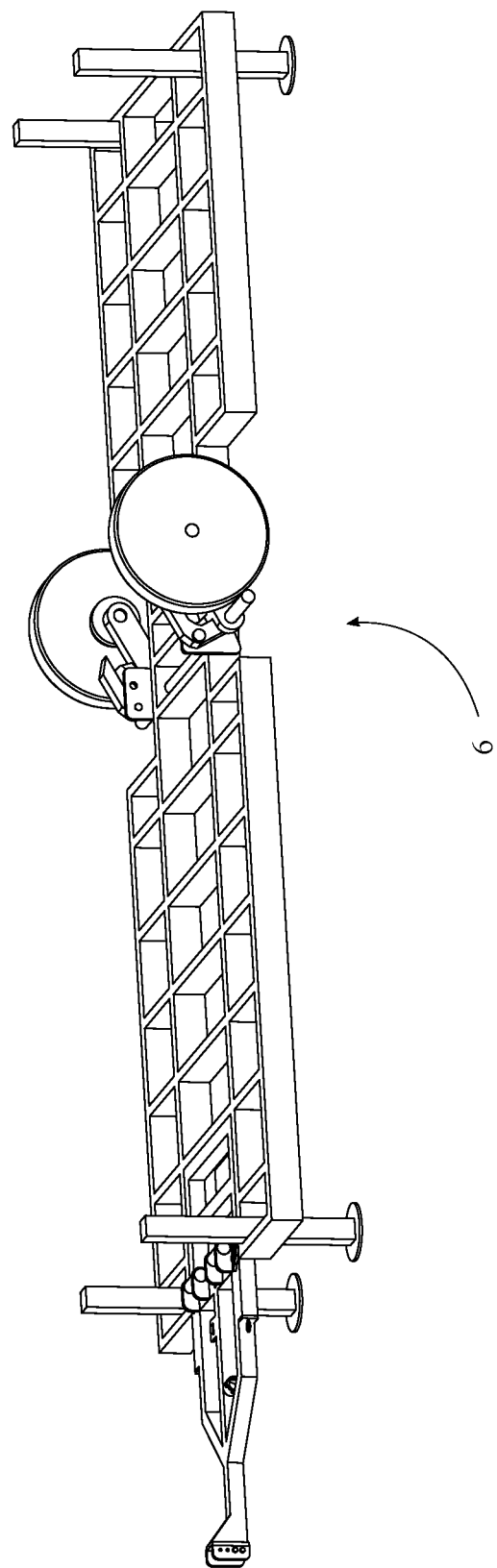
FIG. 6 is a side view of the present invention in the raised deployed position.

Referring to FIGS. 5-6, the lowered transit position 5 of the wheel 38 corresponds to a transit position of the present invention, and the raised deployed position 6 of the wheel 38 corresponds to a deployed position of the present invention. In the transit position, the trailer is able to be towed to a desired location since vehicle frame 1 is held sufficiently raised above the ground for safe transport due to the lowered transit position 5, in which the wheel 38 is positioned sufficiently below the vehicle frame 1 to allow for safe transit. In the deployed position, the vehicle frame 1 is very close to the ground, allowing much easier access to a restroom trailer or other compartments or cargo held by the vehicle frame 1. In the deployed position, the vehicle frame 1 is supported mostly by the plurality of lifting devices 2, while the wheel 38 has been rotated upward into the raised deployed position 6 where the wheel 38 is recessed upward into the vehicle frame 1. Preferably, in the raised deployed position 6, the wheel 38 does still contact the ground in order to provide additional support of the vehicle frame 1 to the plurality of lifting devices 2, but the majority of the weight of the trailer is resting on the plurality of lifting devices 2 instead of the wheel 38.

In the transit position, the suspension transition pin 36 is removably inserted through the stop arm pin hole 344 and the transit position pin hole 332 in order to affix the wheel 38 in the lowered transit position 5. In the deployed position, the suspension transition pin 36 is removably inserted through the stop arm pin hole 344 and the deployed position pin hole 333 in order to affix the wheel 38 in the raised deployed position 6.

One embodiment of the present invention comprises a single pair of wheels 38 and associated swing suspension assembly 3, and four jacks at each corner of the vehicle frame 1. In another embodiment, where a longer trailer is utilized and thus enhanced structural support is required, two of more pairs of wheels 38 and associated swing suspension assemblies may be utilized in addition to additional pairs of jacks at midpoint locations on the vehicle frame 1 as is required to support the trailer.

An example of using the swing suspension assembly 3 is as follows. Initially, the trailer is in a storage location in the deployed position, with the suspension transition pin 36 inserted through the stop arm pin hole 344 and the deployed position pin hole 333. The plurality of lifting devices 2 is activated, expanding vertically and lifting the vehicle frame 1 a small amount, releasing frictional forces between the suspension transition pin 36, the upper stop arm 34 and the suspension transition plate 33 so that the suspension transition pin 36 may be removed. After the suspension transition pin 36 is removed, the plurality of lifting devices 2 is activated again, continuing to expand vertically. Due to gravity, the wheel 38 and the lower swing arm 35 rotate about the suspension axle 32 while the plurality of lifting devices 2 is in operation, rotating the upper stop arm 34 by the same angle as the lower swing arm 35 until the stop arm pin hole 344 is concentric with the transit position pin hole 332 of the suspension transition plate 33. The suspension transition pin 36 is then inserted through the stop arm pin hole 344 and the transit position pin hole 332, the trailer is attached to a towing hitch of a towing vehicle, and the plurality of lifting devices 2 is retracted, causing the weight of the trailer to rest solely on the wheel 38 and the towing hitch.

The trailer is then towed to a desired location, and the reverse process is carried out. The plurality of lifting devices 2 is expanded, contacting the ground and lifting the vehicle frame 1 slightly so that the suspension transition pin 36 may be removed. After the suspension transition pin 36 is removed, the plurality of lifting devices 2 is retracted, lowering the vehicle frame 1 and rotating the lower swing arm 35 and the upper stop arm 34 until the upper stop arm 34 achieves a position where the stop arm pin hole 344 is concentric with the deployed position pin hole 333. The suspension transition pin 36 is then inserted through the stop arm pin hole 344 and the deployed position pin hole 333, securing the present invention in the deployed position.

In one embodiment of the present invention, the folding trailer hitch 4 is mounted, welded or otherwise connected to the vehicle frame 1, forming a chassis mounted trailer hitch for an overall configuration of the present invention to facilitate a "tag-along" trailer configuration.

In one embodiment of the present invention, the folding trailer hitch 4 preferably is a tongue-type trailer hitch, with some of the structure of the trailer hitch being positioned longitudinally outward from the center of the trailer hitch to increase structural strength and support. In other embodiments, it is contemplated that the folding trailer hitch 4 may be embodied in other structural arrangements that facilitate the spirit and functionality of the folding trailer hitch 4 of the present invention herein disclosed.

Figure 7:
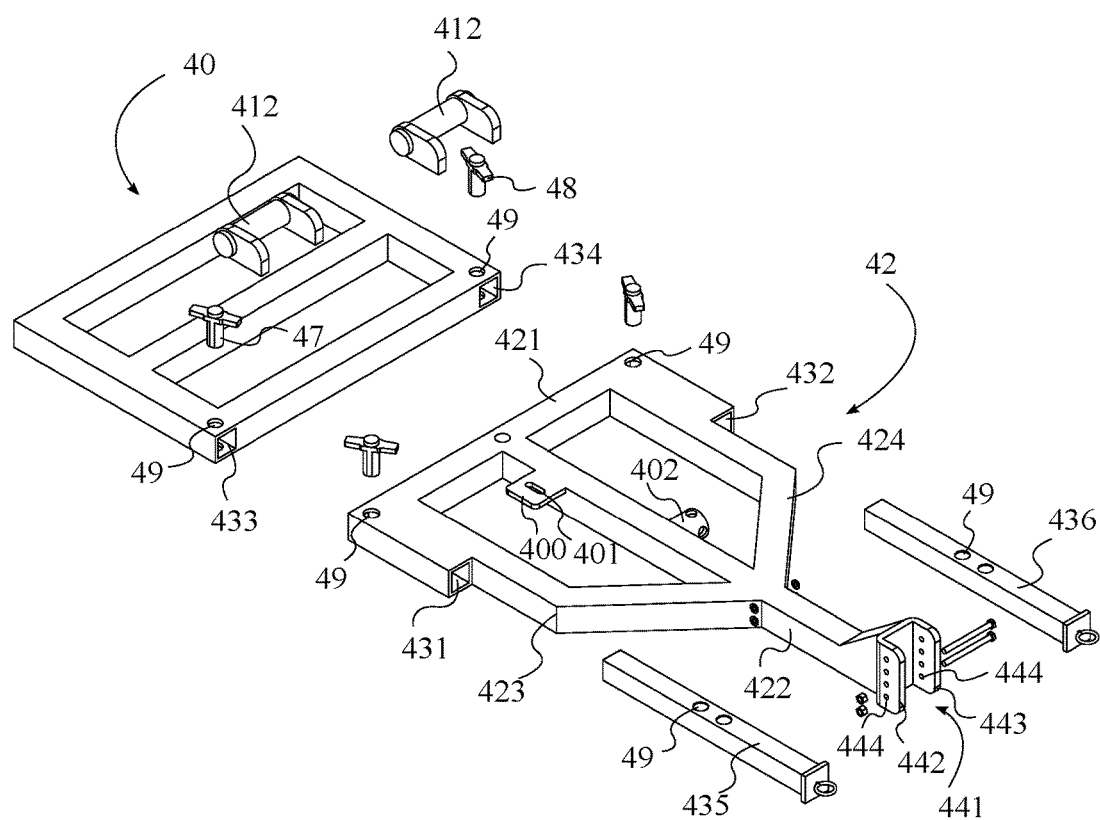
FIG. 7 is an exploded view of the folding trailer hitch.
Figure 8:
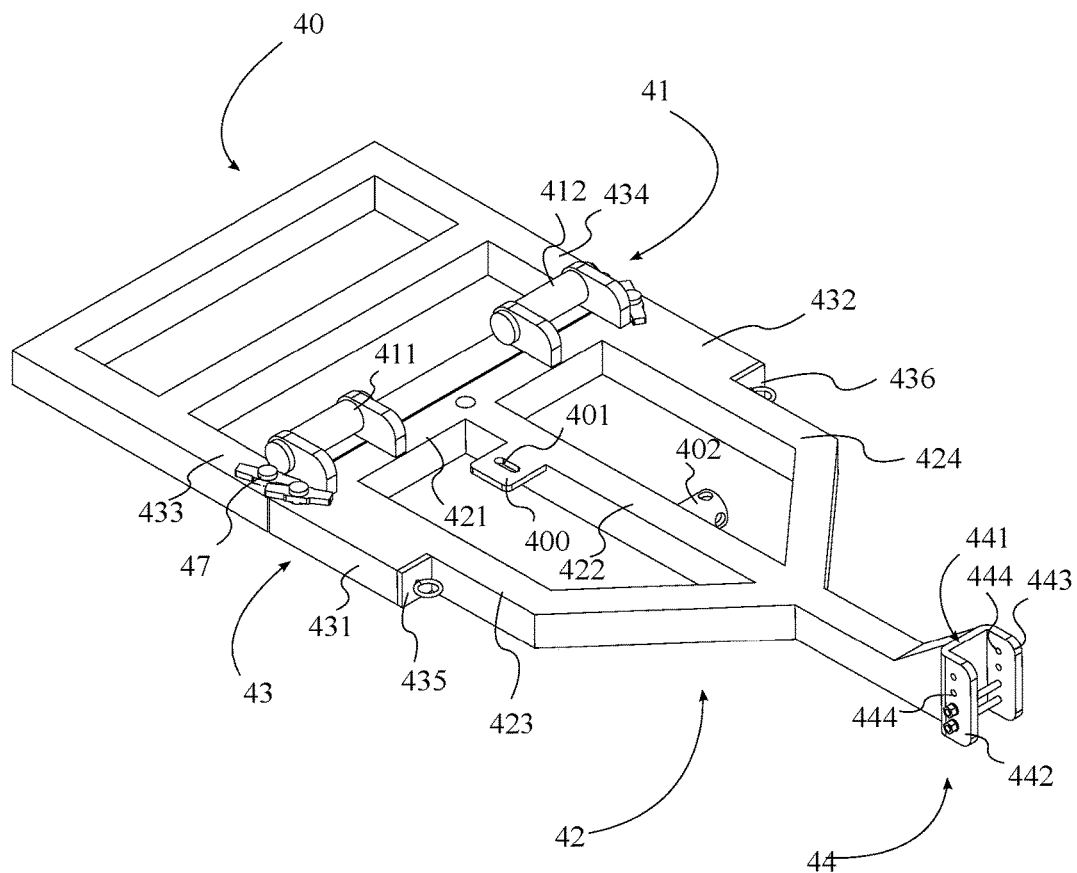
FIG. 8 is a perspective view of the folding trailer hitch in the lowered position.
Figure 9:
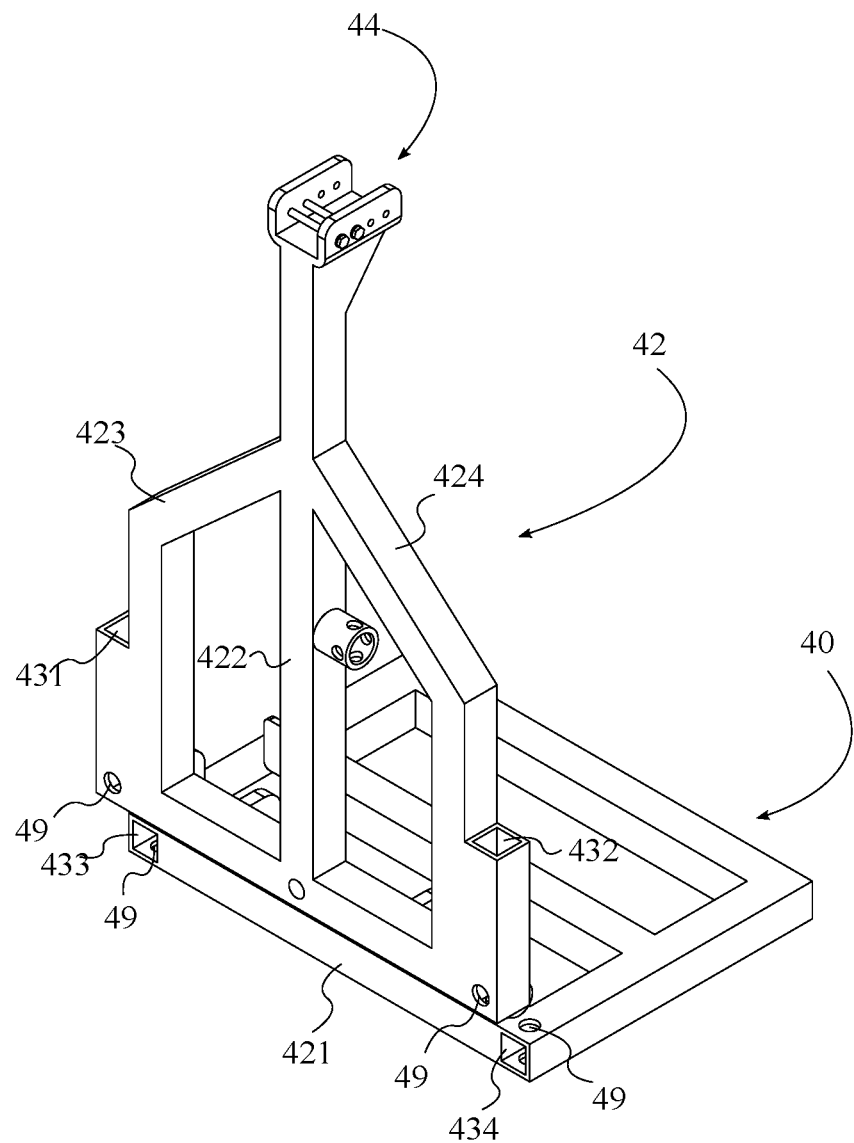
FIG. 9 is a perspective view of the folding trailer hitch in the raised position.

Referring to FIGS. 7-9, in one embodiment, the folding trailer hitch 4 of the present invention comprises a vehicle attachment frame 40, a hinging linkage 41, a hitch support frame 42, an angular lock 43, and a hitching element 44.

The vehicle attachment frame 40 of the folding trailer hitch 4 is connected to the hitch attachment location 14 of the vehicle frame 1, centrally positioned at the forward end 11 of the vehicle frame 1. The hitch support frame 42 is hingedly connected to the vehicle attachment frame 40 by the hinging linkage 41. The angular lock 43 is releasably engaged between the vehicle attachment frame 40 and the hitch support frame 42. The angular lock 43 prevents the hitch support frame 42 from rotating with respect to the vehicle support frame when the angular lock 43 is engaged. The hitching element 44 is connected to the hitch support frame 42 opposite the hinging linkage 41 along the hitch support frame 42.

In one embodiment, the hitch support frame 42 comprises a rear portion 421, a central arm 422, a first lateral arm 423 and a second lateral arm 424. The central arm 422 is connected between the rear portion 421 and the hitching element 44, and the hinging linkage 41 is connected between the vehicle attachment frame 40 and the rear portion 421. Preferably, the first lateral arm 423 and the second lateral arm 424 are positioned symmetrically about the central arm 422, and are connected between the rear portion 421 and the central arm 422 adjacent to the hitching element 44.

It is contemplated that any suitable means or linkage may be utilized to implement the hinging linkage 41 to allow the hitch support frame 42 to rotate between a lowered position 46 and a raised position 45 relative to the vehicle attachment frame 40. However, in one embodiment of the present invention, the hinging linkage 41 comprises a first hinge 411 and a second hinge 412. The first hinge 411 and the second hinge 412 hingedly connect the vehicle attachment frame 40 and the rear portion 421 of the hitch support frame 42. The first hinge 411 and the second hinge 412 are preferably positioned symmetrically about the central arm 422, with the first hinge 411 being positioned adjacent to the first lateral arm 423 and the second hinge 412 being positioned adjacent to the second lateral arm 424.

In the raised position 45, the hitch support frame 42 is oriented substantially vertically and may be secured behind a door of the towable vehicle. In the lowered position 46, the hitch support frame 42 is oriented substantially horizontal for towing.

It is contemplated that many different means may be utilized to embody the angular lock 43. However, in one embodiment, the angular lock 43 comprises a first rod receiving slot 431, a second rod receiving slot 432, a third rod receiving slot 433, a fourth rod receiving slot 434, a first locking rod 435, and a second locking rod 436. The first rod receiving slot 431 and the second rod receiving slot 432 are connected to the hitch support frame 42 adjacent to the hinging linkage 41. The third rod receiving slot 433 and the fourth rod receiving slot 434 are positioned within the vehicle support frame adjacent to the hinging linkage 41. The first rod receiving slot 431 and the second rod receiving slot 432 are oriented parallel to each other, as are the third rod receiving slot 433 and the fourth rod receiving slot 434. The third rod receiving slot 433 is laterally aligned with the first rod receiving slot 431, and the fourth rod receiving slot 434 is laterally aligned with the second rod receiving slot 432.

In one embodiment of the present invention, the first rod receiving slot 431 is positioned parallel and adjacent to the first lateral arm 423 of the hitch support frame 42 adjacent to the rear portion 421 of the hitch support frame 42. Likewise, the second rod receiving slot 432 is positioned parallel and adjacent to the second lateral arm 424 adjacent to the rear portion 421. Preferably, the first rod receiving slot 431 and the second rod receiving slot 432 are positioned symmetrically about the central arm 422.

When the hitch support frame 42 is in a lowered position 46, the first rod receiving slot 431 and the third rod receiving slot 433 are parallel to and aligned with each other, enabling the first locking rod 435 to be removably positioned within the first rod receiving slot 431 and the third rod receiving slot 433, and similarly the second locking rod 436 to be removably positioned within the second rod receiving slot 432 and the fourth rod receiving slot 434, thus physically restraining rotation of the hitch support frame 42 with respect to the vehicle attachment frame 40. In one embodiment, the third rod receiving slot 433 and the fourth rod receiving slot 434 of the vehicle attachment frame 40 are oriented horizontally with respect to the ground when attached to a trailer or other unpowered towable vehicle. Thus, in the lowered position 46, the hitch support frame 42 and therefore the first rod receiving slot 431 and the second rod receiving slot 432 are also oriented horizontally. In one embodiment, the hitch support frame 42 is restrained from ever rotating below horizontal with respect to the vehicle attachment frame 40. This may be accomplished simply by positioning the vehicle attachment frame 40 and the hitch support frame 42 recessed from the edge of the towable vehicle, therefore blocking the hitch support frame 42 from rotating beyond the horizontal position with the edge of the towable vehicle. Alternatively, stops may be utilized in any position which accomplishes the same purpose.

In one embodiment of the present invention, the folding trailer hitch 4 additionally comprises a first locking pin 47 and a second locking pin 48. Furthermore, the first locking rod 435, the second locking rod 436, the third rod receiving slot 433 and the fourth rod receiving slot 434 each comprise a pin hole 49. The pin hole 49 of the first locking rod 435 and the third rod receiving slot 433 are concentrically aligned with each other when the first locking rod 435 is engaged within the first rod receiving slot 431 and the third rod receiving slot 433. Similarly, the pin hole 49 of the second locking rod 436 and the pin hole 49 of the fourth rod receiving slot 434 are concentrically aligned with each other when the second locking rod 436 is engaged within the second rod receiving slot 432 and the fourth rod receiving slot 434. Therefore, the first locking pin 47 may be removably positioned within the pin hole 49 of the third rod receiving slot 433 and the pin hole 49 of the first locking rod 435 in order to secure the first locking rod 435 within the first rod receiving slot 431 and the third rod receiving slot 433, and the second locking pin 48 may be removably positioned within the pin hole 49 of the fourth rod receiving slot 434 and the pin hole 49 of the second locking rod 436 in order to secure the second locking rod 436 within the second rod receiving slot 432 and the fourth rod receiving slot 434, thus securing the hitch support frame 42 and the vehicle attachment frame 40 into alignment in the lowered position 46. In order to raise the hitch support frame 42 into the raised position 45, the first locking pin 47 and the second locking pin 48 must be removed from their respective pin hole 49s, and the first locking rod 435 and the second locking rod 436 must be removed from their respective rod receiving slots.

While the first locking rod 435 and the second locking rod 436 serve to engage the angular lock 43 so that the hitch support frame 42 cannot rotate relative to the vehicle attachment frame 40, the first locking pin 47 and the second locking pin 48 serve to secure the first locking rod 435 and the second locking rod 436 in place to fully secure the angular lock 43. Without the first locking pin 47 and the second locking pin 48 holding the first locking rod 435 and the second locking rod 436 in place, there is a risk of the first locking rod 435 and the second locking rod 436 becoming dislodged and falling out. Additionally, in one embodiment, a third locking pin and a fourth locking pin are comprised. The third locking pin and the fourth locking pin function similarly to the first locking pin 47 and the second locking pin 48, with the difference that the third locking pin and the fourth locking pin secure the first locking rod 435 and the second locking rod 436 to the first rod receiving slot 431 and the second rod receiving slot 432 on the hitch support frame 42, as opposed to the third rod receiving slot 433 and the fourth rod receiving slot 434 on the vehicle attachment frame 40. The angular lock 43 would function with only the first locking pin 47 and the second locking pin 48, or with only the third locking pin and the fourth locking pin, or with all four locking pins. It is preferable to utilize all four locking pins for robust structural support and security of the angular lock 43.

In one embodiment, the hitching element 44 of the present invention comprises a c-channel 441 with a first side 442 and a second side 443. The first side 442 and the second side 443 are oriented perpendicular to the central arm 422, parallel to each other and comprise at least one bolt hole 444. The first side 442 and the second side 443 are oriented such that a normal vector to the first side 442 and the second side 443 is oriented laterally, parallel to the rear portion 421 of the hitch support frame 42. Each bolt hole 444 of the first side 442 is concentrically positioned with one of the bolt hole 444s of the second side 443, so that various different implements and types of hitches may be attached to the hitching element 44. The ability to substitute different type of hitches and other attachments gives the present invention a wide range of versatility for towing applications. In another embodiment, the hitching element 44 comprises a standard hitch ball and does not provide the versatility of being able to substitute different attachments.

One embodiment of the folding trailer hitch 4 additionally comprises a storage tab 400 that is connected laterally adjacent to the central arm 422, preferably approximately midway along the length of the central arm 422. The storage tab 400 comprises a bolt receiving slot 401 that traverses through the storage tab 400 perpendicular to the central arm 422. The purpose of the storage tab 400 is to secure the hitch support frame 42 in the raised position 45. In the raised position 45, the bolt receiving slot 401 will align with a bolt positioned on the exterior of the towable vehicle which will be inserted through the bolt receiving slot 401 with a nut being fastened to the bolt in order to secure the storage tab 400 and thus the hitch support frame 42 in place.

Additionally, one embodiment of the present invention comprises a jack connection 402 that is connected adjacent to the central arm 422 of the hitch support frame 42, similar to the storage tab 400. The storage tab 400 and the jack connection 402, however, are preferably positioned on opposite lateral sides of the central arm 422. The jack connection 402 is a protrusion (or cavity, if suitable) that enables a jack to be attached to the hitch support frame 42 in order to jack the hitch support frame 42 off the ground.

Additionally, in one embodiment, the central arm 422 is hollow. This allows any required cords and wires to be run through the central arm 422 in order to facilitate any necessary electrical connections for legally required lights on the towable vehicle to be operational.

Although the invention has been explained in relation to its preferred embodiment, it is to be understood that many other possible modifications and variations can be made without departing from the spirit and scope of the invention as hereinafter claimed.

What is claimed is:

1. A lowerable vehicle frame with a folding trailer hitch for trailers and other vehicles comprises:
   a vehicle frame;
   a plurality of lifting devices;
   at least one swing suspension assembly;
   a folding trailer hitch;
   the vehicle frame comprises a forward end, a rear end, at least one suspension attachment location and a hitch attachment location, wherein the forward end and the rear end are longitudinal extremities of the vehicle frame;
   each swing suspension assembly comprises a first suspension half and a second suspension half;
   the hitch attachment location of the vehicle frame being positioned at the forward end of the vehicle frame;
   each suspension attachment location of the vehicle frame being positioned longitudinally between the forward end and the rear end of the vehicle frame;
   the plurality of lifting devices being distributed around the vehicle frame;
   the plurality of lifting devices being operatively engaged with the vehicle frame, wherein the vehicle frame is vertically lifted or lowered by the plurality of lifting devices;
   each swing suspension assembly being connected to the vehicle frame at one of the suspension attachment locations;
   the first suspension half and the second suspension half being positioned laterally opposite each other on the vehicle frame for each swing suspension assembly;
   the first suspension half and the second suspension half being releasably engaged between a lowered transit position and a raised deployed position relative to the vehicle frame, wherein a wheel of the first suspension half and the second suspension half is raised in the raised deployed position and lowered in the lowered transit position;
   the folding trailer hitch being hingedly connected to the vehicle frame at the hitch attachment location;
   the folding trailer hitch comprises a vehicle attachment frame, a hinging linkage, a hitch support frame, an angular lock, and a hitching element;
   the vehicle attachment frame of the folding trailer hitch being connected to the hitch attachment location of the vehicle frame;
   the hitch support frame being hingedly connected to the vehicle attachment frame by the hinging linkage;
   the angular lock being releasably engaged between the vehicle attachment frame and the hitch support frame, wherein the angular lock prevents the hitch support frame from rotating with respect to the hitch support frame when the angular lock is engaged; and
   the hitching element being connected to the hitch support frame opposite the hinging linkage along the hitch support frame.

2. The lowerable vehicle frame with a folding trailer hitch for trailers and other vehicles as claimed in claim 1 comprises:
   the first suspension half and the second suspension half each comprise a suspension axle, a suspension transition plate, a lower swing arm, an upper stop arm, a suspension transition pin, a damper pad, and a wheel;
   the suspension axle being connected to the vehicle frame at the suspension attachment location, wherein the suspension axle is oriented laterally with respect to the vehicle frame;
   the suspension transition plate being attached to the vehicle frame adjacent to the suspension attachment location;
   the upper stop arm being rotatably connected to the suspension axle adjacent to the suspension transition plate, opposite the vehicle frame;
   the lower swing arm being rotatably connected to the suspension axle adjacent to the upper stop arm opposite the suspension transition plate;
   the wheel being rotatably connected to the lower swing arm opposite the suspension axle along the lower swing arm;
   the upper stop arm being releaseably engaged with the suspension transition plate by the suspension transition pin; and
   the damper pad being positioned between the lower swing arm and the upper stop arm.

3. The lowerable vehicle frame with a folding trailer hitch for trailers and other vehicles as claimed in claim 2 comprises:
   the first suspension half and the second suspension half each further comprise a wheel axle;
   the suspension transition plate comprises a first suspension axle aperture, a transit position pin hole, and a deployed position pin hole;
   the lower swing arm comprises a third suspension axle aperture and a wheel axle aperture;
   the upper stop arm comprises an axle connection portion, a damper pad portion, a second suspension axle aperture and a stop arm pin hole;
   the third suspension axle aperture and the wheel axle aperture being positioned opposite each other along the lower swing arm;
   the wheel axle concentrically traversing through the wheel axle aperture;
   the wheel being rotatably connected to the wheel axle;
   the first suspension axle aperture being positioned adjacent to the suspension attachment location; and
   the transit position pin hole and the deployed position pin hole being positioned equidistant from the first suspension axle aperture, wherein the distance between the first suspension axle aperture and the transit position pin hole, the distance between the first suspension axle aperture and the deployed position pin hole, and the distance between the second suspension axle aperture and the stop arm pin hole are equivalent.

4. The lowerable vehicle frame with a folding trailer hitch for trailers and other vehicles as claimed in claim 3 comprises:
   the damper pad portion being positioned adjacent to the damper pad opposite the lower swing arm, wherein the damper pad portion is parallel to the lower swing arm;
   the stop arm pin hole being positioned between the axle connection portion and the damper pad portion;
   the second suspension axle aperture being positioned on the axle connection portion;
   the stop arm pin hole and the second suspension axle aperture being oriented parallel to each other;
   the axle connection portion being rotatably connected to the suspension axle at the second suspension axle aperture;

the damper pad portion being connected to the axle connection portion opposite the second suspension axle aperture along the axle connection portion,
wherein the axle connection portion is perpendicular to the damper pad portion; and
wherein the upper stop arm is substantially L-shaped.

5. The lowerable vehicle frame with a folding trailer hitch for trailers and other vehicles as claimed in claim 2 comprises:
the third suspension axle aperture, the second suspension axle aperture, and the first suspension axle aperture being concentrically positioned with each other;
the third suspension axle aperture being positioned adjacent to the second suspension axle aperture;
the first suspension axle aperture being positioned adjacent to the second suspension axle aperture opposite the third suspension axle aperture; and
the suspension axle concentrically traversing through the third suspension axle aperture, the second suspension axle aperture, and the first suspension axle aperture.

6. The lowerable vehicle frame with a folding trailer hitch for trailers and other vehicles as claimed in claim 2 comprises:
the damper pad being attached between the lower swing arm and the upper stop arm, wherein the damper pad acts as a shock absorber between the lower swing arm and the upper stop arm.

7. The lowerable vehicle frame with a folding trailer hitch for trailers and other vehicles as claimed in claim 2 comprises:
the suspension transition pin being removably inserted into the stop arm pin hole and the transit position pin hole in order to affix the wheel in a lowered wheel position.

8. The lowerable vehicle frame with a folding trailer hitch for trailers and other vehicles as claimed in claim 2 comprises:
the suspension transition pin being removably inserted into the stop arm pin hole and the deployed position pin hole in order to affix the wheel in a raised wheel position.

9. The lowerable vehicle frame with a folding trailer hitch for trailers and other vehicles as claimed in claim 1 comprises:
the hitch support frame comprises a rear portion, a central arm, a first lateral arm and a second lateral arm;
the hinging linkage being connected between the vehicle attachment frame and the rear portion; and
the central arm being connected between the rear portion and the hitching element.

10. The lowerable vehicle frame with a folding trailer hitch for trailers and other vehicles as claimed in claim 1 comprises:
the first lateral arm and the second lateral arm being connected between the rear portion and the central arm adjacent to the hitching element.

11. The lowerable vehicle frame with a folding trailer hitch for trailers and other vehicles as claimed in claim 1 comprises:
the angular lock comprises a first rod receiving slot, a second rod receiving slot, a third rod receiving slot, a fourth rod receiving slot, a first locking rod, and a second locking rod;
the first rod receiving slot and the second rod receiving slot being connected to the hitch support frame adjacent to the hinging linkage;
the third rod receiving slot and the fourth rod receiving slot being positioned within the vehicle support frame adjacent to the hinging linkage;
the first rod receiving slot and the second rod receiving slot being oriented parallel to each other;
the third rod receiving slot and the fourth rod receiving slot being oriented parallel to each other;
the third rod receiving slot being laterally aligned with the first rod receiving slot;
the fourth rod receiving slot being laterally aligned with the second rod receiving slot;
the first locking rod being removably positioned within the first rod receiving slot and the third rod receiving slot; and
the second locking rod being removably positioned within the second rod receiving slot and the fourth rod receiving slot.

12. The lowerable vehicle frame with a folding trailer hitch for trailers and other vehicles as claimed in claim 11 comprises:
the first rod receiving slot being positioned parallel and adjacent to a first lateral arm of the hitch support frame adjacent to a rear portion of the hitch support frame; and
the second rod receiving slot being positioned parallel and adjacent to a second lateral arm of the hitch support frame adjacent to the rear portion.

13. The lowerable vehicle frame with a folding trailer hitch for trailers and other vehicles as claimed in claim 12 comprises:
the first rod receiving slot and the second rod receiving slot being positioned symmetrically about a central arm of the hitch support frame.

14. The lowerable vehicle frame with a folding trailer hitch for trailers and other vehicles as claimed in claim 11 comprises:
a first locking pin and a second locking pin;
the first locking rod, the second locking rod, the third rod receiving slot and the fourth rod receiving slot each comprise a pin hole;
the first locking pin being removably positioned within the pin hole of the third rod receiving slot and the pin hole of the first locking rod; and
the second locking pin being removably positioned within the pin hole of the fourth rod receiving slot and the pin hole of the second locking rod.

15. The lowerable vehicle frame with a folding trailer hitch for trailers and other vehicles as claimed in claim 1 comprises:
the hitching element comprises a c-channel with a first side and a second side;
the first side and the second side each comprise at least one bolt hole; and
each of the at least one bolt hole of the first side being positioned concentrically with one of the at least one bolt hole of the second side.

16. The lowerable vehicle frame with a folding trailer hitch for trailers and other vehicles as claimed in claim 1 comprises:
the hinging linkage comprises a first hinge and a second hinge; and
the first hinge and the second hinge hingedly connecting the vehicle attachment frame and a rear portion of the hitch support frame.

17. The lowerable vehicle frame with a folding trailer hitch for trailers and other vehicles as claimed in claim 16 comprises:

the first hinge being positioned adjacent to the first lateral arm; and the second hinge being positioned adjacent to the second lateral arm.

18. The lowerable vehicle frame with a folding trailer hitch for trailers and other vehicles as claimed in claim 1 comprises:

a storage tab;

the storage tab being connected laterally adjacent to a central arm of the hitch support frame; and the storage tab comprises a bolt receiving slot traversing through the storage tab perpendicular to the central arm.

19. The lowerable vehicle frame with a folding trailer hitch for trailers and other vehicles as claimed in claim 1 comprises:

a jack connection; and the jack connection being connected adjacent to a central arm of the hitch support frame.

* * * * *